United States Patent

Steinberg et al.

(10) Patent No.: US 6,884,474 B2
(45) Date of Patent: Apr. 26, 2005

(54) METHOD OF COATING A SHAPED BODY MADE OF POLYMER MATERIAL

(75) Inventors: Helmut Steinberg, Stoernstein (DE); Josef Krauthan, Baernau (DE)

(73) Assignee: Nexans, Paris (FR)

( * ) Notice: Subject to any disclaimer, the term of this patent is extended or adjusted under 35 U.S.C. 154(b) by 42 days.

(21) Appl. No.: 10/265,708

(22) Filed: Oct. 8, 2002

(65) Prior Publication Data

US 2003/0068449 A1 Apr. 10, 2003

(30) Foreign Application Priority Data

Oct. 9, 2001 (DE) ......................................... 101 49 834

(51) Int. Cl.$^7$ ................................................ B05D 5/06
(52) U.S. Cl. ..................................... 427/569; 427/162
(58) Field of Search ................................. 427/569, 162

(56) References Cited

U.S. PATENT DOCUMENTS

| | | | |
|---|---|---|---|
| 5,522,007 A | 5/1996 | Drouart et al. | |
| 5,916,495 A | 6/1999 | Nonaka et al. | |
| 5,963,701 A | * 10/1999 | Nakamura et al. | .......... 385/143 |

| | | | | |
|---|---|---|---|---|
| 2001/0000897 A1 | 5/2001 | Li et al. | | |

FOREIGN PATENT DOCUMENTS

| | | | | |
|---|---|---|---|---|
| DE | 4125157 A1 | * 2/1993 | ........... A61L/27/00 |
| DE | 4414083 C2 | 10/1995 | |
| EP | 905717 A1 | * 3/1999 | ........... H01B/13/14 |

* cited by examiner

Primary Examiner—Elena Tsoy
(74) Attorney, Agent, or Firm—Sughrue Mion, PLLC

(57) ABSTRACT

A method of coating an oblong shaped body (8) made of polymer material, which is intended for guiding light in the form of optical signals. In this case, a coating made of polymer material having a lower index of refraction than the shaped body (8) is applied around the shaped body (8). To generate the coating, a coating facility (A) having at least one chamber (1) is used, to which a halogenated gas (4) and/or gas mixture is supplied. The halogenated gas (4) and/or gas mixture is converted into a plasma (6) in the chamber (1) under the effect of microwaves (5) and conducted out of the chamber (1) through a nozzle (7). The shaped body (8) is moved at least one time over its entire length along the coating facility (A) in the region of the nozzle (7) and/or the plasma (6) emitting therefrom and, at the same time, provided with a coating (9) made of a halogenated polymer, which is generated by the incidence of the plasma (6).

2 Claims, 1 Drawing Sheet

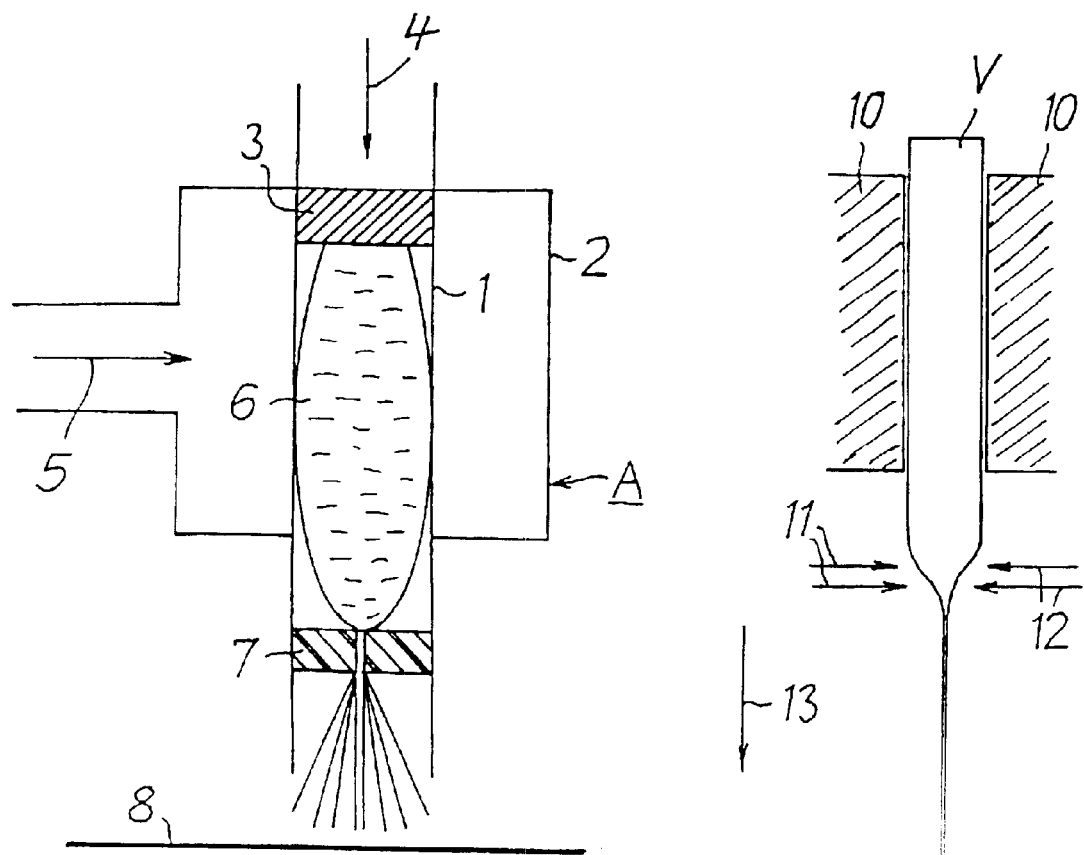
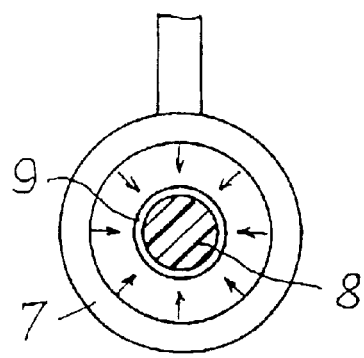
Fig. 1
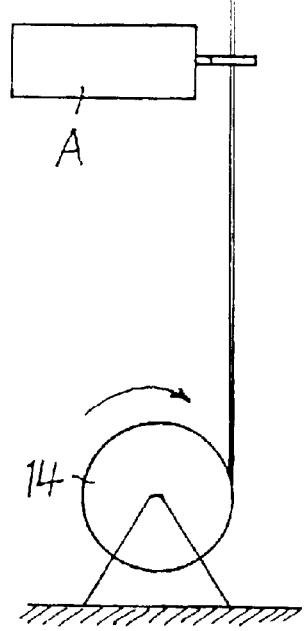
Fig. 2
Fig. 3

METHOD OF COATING A SHAPED BODY MADE OF POLYMER MATERIAL

This application is based on and claims the benefit of German Patent Application No. 10149834.9 filed Oct. 9, 2001, which is incorporated by reference herein.

SUMMARY OF THE INVENTION

The invention relates to a method of coating an oblong shaped body made of polymer material, which is provided for guiding light in the form of optical signals i.e., an optical polymer fiber, using a coating made of polymer material having a lower index of refraction than the shaped body and applied around the shaped body, e.g., disclosed in European Patent Application 1 052 527 A1.

A "shaped body" according to the invention may be a fiber made of polymer material for conducting light and/or optical signals. However, the shaped body may also be a rod used as a preform, from which a polymer fiber may be drawn. For the sake of simplicity, only the polymer fibers are discussed in the following. They are used, for example, in automobiles for transmitting optical signals. Polymer fibers do have high losses in comparison to glass fibers used, e.g., in telecommunications engineering, but they are preferred in automobile construction precisely due to their better mechanical properties, for example. In order that light may be transmitted via a polymer fiber, it must be contained in a layer made of a suitable material.

Using the method according to the above-cited European Patent Application 1 052 527 A1, a coating made of a polymer and a cladding coating are applied around a polymer fiber by extrusion. These coatings ensure that light may be transmitted over a long distance via the fiber. A fiber coated in this way has specific characteristics as a function of the material used for coating and its coating thickness. These characteristics may only be changed by using a different coating material. Tailoring of fibers to different transmission characteristics is therefore complicated.

SUMMARY OF THE INVENTION

It is an object of the invention to adapt the above-described method in such a way that polymer fibers having different transmission characteristics may be easily produced.

This object is achieved according to the invention in that
the fiber is coated in a coating facility having at least one chamber, to which a halogenated gas and/or gas mixture is supplied,
the halogenated gas and/or gas mixture is converted into a plasma in the chamber under the effect of microwaves and conducted out of the chamber through a nozzle, and
the fiber is moved at least one time over its entire length along the coating facility in the region of the nozzle and/or the plasma emitting therefrom and, at the same time, provided with a coating made of a halogenated polymer which is generated by the incidence of the plasma.

Using this method, at least a single-layer coating, which allows the guiding of light and has a coating thickness which is easily variable, may be generated around the polymer fiber. The coating thickness of the coating material is a function of how many times the fiber is moved along the coating facility. In this case, it is easily possible to apply different coatings in sequence in one work cycle by using two or more chambers of the coating facility. In this way, both step index fibers and gradient fibers may be produced easily, both also having characteristics which are a function of the coating thickness of the overall coatings applied. In a preferred embodiment, a fluoropolymer which has an index of refraction of approximately 1.40 is used for coating the fiber. The index of refraction of a polymer material used for the fiber itself, such as polymethyl methacrylate, is approximately 1.49.

The coating facility used in this method is known per se. It operates according to the atmospheric pressure non-equilibrium plasma method. Such a coating facility has been used until now, for example, for coating plastics with metals, such as titanium, or for coating glass, aluminum, and ceramic with different materials, such as silicon, tin, titanium, or platinum. The coating facility has a chamber, to which a gas containing a coating material is supplied. The chamber is positioned in a housing in which it is irradiated with microwaves. Through this, a plasma is generated in the chamber which exits the chamber under pressure via a nozzle. It then strikes an object to be coated.

BRIEF DESCRIPTION OF THE DRAWINGS

The method according to the invention is described with reference to the drawing as an exemplary embodiment.

FIG. 1 schematically shows a coating facility for performing the method according to the invention.

FIG. 2 shows a detail of the coating facility in an enlarged illustration.

FIG. 3 also schematically shows an arrangement for producing a high-quality polymer fiber.

DETAILED DESCRIPTION OF THE INVENTION

In principle, halogenated materials are suitable for performing the method according to the invention. Fluoropolymers have been shown to be particularly favorable as a coating material. Therefore, a fluorinated gas and/or gas mixture, which is referred to in the following—as a representative of all other usable materials—only as "gas", may be used for the coating, for example. The invention is also described in the following for coating a polymer fiber—without restricting its general validity. The phrase "shaped body" is therefore replaced by the word "fiber" for the sake of simplicity.

The coating facility illustrated in FIG. 1—referred to in the following as "facility A"—has a central chamber 1 and a housing 2 which surrounds it while enclosing a cavity. Chamber 1 is made of a material which is not excitable by microwaves, such as quartz glass or plastic. During operation of facility A, chamber 1 is supplied with a fluorinated gas 4 via an inlet 3, which is only permeable in one direction. Fluorinated gas 4 is irradiated with microwaves 5 in chamber 1. Therefore, a conversion of the molecules contained in the gas into reactive intermediate stages, such as radicals or ions, occurs, and a plasma 6 is formed. Plasma 6, which is under pressure due to the continuous supply of fluorinated gas 4, leaves chamber 1 through a nozzle 7, and then impacts a polymer fiber 8.

Due to the incidence of fluorinated plasma 6 on the polymer material of fiber 8, the material reacts in combination and/or recombination with the intermediate stages of plasma 6, and a coating 9 (FIG. 2) made of a fluoropolymer is generated on fiber 8. Coating 9 has, for example, a thickness of approximately 0.5 $\mu$m. Coatings 9 having a thickness of 0.1 $\mu$m to 1.0 $\mu$m may be generated. To produce a specific coating thickness, fiber 8 may be moved along nozzle 7 twice or possibly even more than twice.

Nozzle 7 is expediently implemented in a ring shape, as illustrated in FIG. 2. In this way, coating 9 may be applied easily all around fiber 8. Fiber 8 is moved as centrally as possible through nozzle 7.

Using a coating facility A having only one chamber 1, only identical materials may be applied onto fiber 8 in one work cycle. If coatings 9 made of different materials are to be applied to achieve different characteristics of coated fibers 8, a coating facility A having two or more chambers 1 may be used. Differently doped gases may be introduced into these chambers 1. Fiber 8 passes through the at least two chambers in sequence in the same work cycle. Instead of one coating facility A having two or more chambers 1, two or more coating facilities A, each having only one chamber 1, may be arranged one behind the other.

The method according to the invention may—as already described—be used for a rod made of polymer material, which is usable as a preform. However, in a preferred embodiment it is used for polymer fibers 8 which are, as shown in FIG. 3, produced and coated as follows, for example:

A preform V made of polymer material is positioned in a holder 10, which is only indicated schematically. It is heated on its lower end as shown by arrows 11 and 12 and brought into a free-flowing state in this way. As the method progresses, preform V is moved in the direction of arrow 13. First, a type of droplet, which is drawn in the direction of arrow 13 to generate fiber 8, forms on the softened end of preform V. After sufficient cooling, fiber 8 is pulled along nozzle 7 of a facility A as shown in FIG. 1, which lies in its path, and provided with coating 9 made of a fluoropolymer at the same time. Coated fiber 8 may be wound up on a spool 14.

If the coating thickness of coating 9 is not sufficient after a single pass through facility A, fiber 8 may be passed through the facility a second time or even more after the drawing procedure is finished. At least one further facility A may also be used.

The vertical mode of operation described with reference to FIG. 3 may also be replaced by a correspondingly adjusted horizontal mode of operation.

What is claimed is:

1. A method of coating an oblong polymer fiber, which is provided for guiding light in the form of optical signals, said method comprising:

applying around the fiber a coating made of polymer material having a lower index of refraction than the fiber, wherein said applying step further comprises:

coating the fiber in a coating facility having at least one chamber, to which a halogenated gas and/or gas mixture is supplied, and a ring-shaped nozzle, through which the fiber is moved, converting the halogenated gas and/or gas mixture into a plasma in the chamber under the effect of microwaves and removing the plasma from the chamber through the nozzle, and moving the fiber at least one time over its entire length through the ring-shaped nozzle of the coating facility thereby providing the fiber with a coating made of a halogenated polymer which is generated by the incidence of the plasma in order to achieve a variable coating thickness around the fiber.

2. The method according to claim of claim 1, wherein a fluorinated gas and/or gas mixture is supplied to the coating facility.

* * * * *